US012412556B2

(12) United States Patent
Park

(10) Patent No.: US 12,412,556 B2
(45) Date of Patent: Sep. 9, 2025

(54) METHOD AND DEVICE FOR REMOVING NOISE BY USING DEEP LEARNING ALGORITHM

(71) Applicant: MOBILINT INC., Seoul (KR)

(72) Inventor: Jongjun Park, Seoul (KR)

(73) Assignee: MOBILINT INC., Seoul (KR)

( * ) Notice: Subject to any disclaimer, the term of this patent is extended or adjusted under 35 U.S.C. 154(b) by 232 days.

(21) Appl. No.: 18/326,045

(22) Filed: May 31, 2023

(65) Prior Publication Data

US 2023/0306946 A1 Sep. 28, 2023

Related U.S. Application Data

(63) Continuation of application No. PCT/KR2020/018195, filed on Dec. 11, 2020.

(30) Foreign Application Priority Data

Dec. 9, 2020 (KR) ........................ 10-2020-0171281

(51) Int. Cl.
*H04R 3/02* (2006.01)
*G10K 11/175* (2006.01)
(Continued)

(52) U.S. Cl.
CPC ........ *G10K 11/175* (2013.01); *G10L 21/0272* (2013.01); *G10L 25/84* (2013.01)

(58) Field of Classification Search
CPC .... G10K 11/175; G10L 21/0272; G10L 25/84
See application file for complete search history.

(56) References Cited

U.S. PATENT DOCUMENTS 10,446,170 B1 * 10/2019 Chen ...................... G06N 20/00
10,818,309 B2 10/2020 Lee et al.
(Continued)

FOREIGN PATENT DOCUMENTS

KR 10-2011-0109333 A 10/2011
KR 10-2016-0034549 A 3/2016
(Continued)

OTHER PUBLICATIONS

International Search Report issued in PCT/KR2020/018195; mailed Aug. 17, 2021.

*Primary Examiner* — Simon King
(74) *Attorney, Agent, or Firm* — Studebaker Brackett PLLC

(57) ABSTRACT

Disclosed is a method and device for canceling noise by using a deep learning algorithm. The method includes collecting a noise signal, obtaining a first sound signal, which is obtained by extracting only a voice signal from the collected noise signal, and 'P' being a probability value indicating that a human voice signal is included in the collected noise signal, through a deep learning algorithm, and on a basis of a value of the 'P', outputting the first sound signal or a second sound signal obtained by converting an overall volume of the collected noise signal. At this time, the second sound signal may be a sound signal, of which a reduction ratio of a volume is converted to be great as the volume corresponds to a great portion, from among the collected noise signal.

13 Claims, 3 Drawing Sheets

(51) Int. Cl.
*G10L 21/0272* (2013.01)
*G10L 25/84* (2013.01)

(56) References Cited

U.S. PATENT DOCUMENTS

| | | | | |
|---|---|---|---|---|
| 10,867,616 | B2 * | 12/2020 | Chen | G10L 21/0208 |
| 10,986,235 | B2 * | 4/2021 | Seo | H04M 9/082 |
| 2007/0021958 | A1 * | 1/2007 | Visser | G10L 25/78 704/226 |
| 2008/0201138 | A1 * | 8/2008 | Visser | G10L 21/0272 704/227 |
| 2019/0394339 | A1 | 12/2019 | Seo et al. | |
| 2020/0043509 | A1 | 2/2020 | Chen et al. | |
| 2020/0106879 | A1 * | 4/2020 | Wang | H04M 3/20 |
| 2020/0211580 | A1 | 7/2020 | Lee et al. | |
| 2021/0076124 | A1 * | 3/2021 | Hoang | G10K 11/17837 |
| 2021/0193162 | A1 * | 6/2021 | Hook | G10L 17/00 |
| 2022/0246162 | A1 * | 8/2022 | Liang | G10L 21/0316 |

FOREIGN PATENT DOCUMENTS

| | | | |
|---|---|---|---|
| KR | 10-1884451 | B1 | 8/2018 |
| KR | 10-2019-0094131 | A | 8/2019 |
| KR | 10-2020-0084466 | A | 7/2020 |

* cited by examiner

METHOD AND DEVICE FOR REMOVING NOISE BY USING DEEP LEARNING ALGORITHM

CROSS-REFERENCE TO RELATED APPLICATIONS

The present application is a continuation of International Patent Application No. PCT/KR2020/018195, filed on Dec. 11, 2020, which is based upon and claims the benefit of priority to Korean Patent Application No. 10-2020-0171281 filed on Dec. 9, 2020. The disclosures of the above-listed applications are hereby incorporated by reference herein in their entirety.

BACKGROUND

Embodiments of the inventive concept described herein relate to a method and device for canceling noise by using a deep learning algorithm.

In modern society, noise pollution is a problem not only in daily life but also in special situations such as work life. For example, various incidents caused by noise between floors in apartments frequently occur on the news. A study showing that noise is closely related to high blood pressure as well as potential cancer has also been released.

To mitigate the noise pollution, people wear anti-noise earplugs in a place where loud noises occur, such as construction sites and shooting ranges or hearing protection equipment with noise canceling, which cancels/mitigates noise through voice signal processing to protect hearing.

However, the noise preventing/canceling method prevents/cancels not only the ambient noise but also the voices of nearby people, and thus it is difficult to utilize the noise preventing/canceling method it in an environment where communication with other people is required.

SUMMARY

Embodiments of the inventive concept provide a noise canceling method that effectively reduces/cancels ambient noise and at the same time maintains voices of nearby people, and a device thereof.

Problems to be solved by the inventive concept are not limited to the problems mentioned above, and other problems not mentioned will be clearly understood by those skilled in the art from the following description.

According to an embodiment, a noise canceling method by using a deep learning algorithm performed by a noise canceling device includes collecting a noise signal, obtaining a first sound signal, which is obtained by extracting only a voice signal from the collected noise signal, and ‘P’ being a probability value indicating that a human voice signal is included in the collected noise signal, through a deep learning algorithm, and on a basis of a value of the ‘P’, outputting the first sound signal or a second sound signal obtained by converting an overall volume of the collected noise signal. At this time, the second sound signal may be a sound signal, of which a reduction ratio of a volume is converted to be great as the volume corresponds to a great portion, from among the collected noise signal.

In an embodiment of the inventive concept, the outputting of the first sound signal or the second sound signal may include outputting the first sound signal when the value of the ‘P’ is greater than or equal to ‘0’ and less than a first reference value, outputting the second sound signal when the value of the ‘P’ is greater than or equal to the first reference value and less than or equal to a second reference value, and outputting the first sound signal when the value of the ‘P’ is greater than the first reference value and less than or equal to ‘1’. At this time, the first reference value and the second reference value may be set in advance.

In an embodiment of the inventive concept, the second sound signal may be a signal obtained by converting a volume of the collected noise signal based on Equation 1:

$$y=\log(x+1). \qquad \text{[Equation]}$$

In this case, ‘x’ is the volume of the collected noise signal, and ‘y’ is the converted volume of the second sound signal.

In an embodiment of the inventive concept, the obtaining of ‘P’ may include obtaining the first sound signal through the deep learning algorithm, and obtaining the value of the ‘P’ through the deep learning algorithm. At this time, the obtaining of the first sound signal and the obtaining of the value of the ‘P’ may be performed in time series. Alternatively, the obtaining of the first sound signal and the obtaining of the value of the ‘P’ may be performed integrally through a single algorithm.

In an embodiment of the inventive concept, the deep learning algorithm may be learned based on a first training data set including only a sound signal other than a human voice signal, and a second training data set including an arbitrary noise signal in an arbitrary human voice signal.

According to an embodiment, a noise canceling device includes a signal input device that collects a noise signal, a processor that obtains a first sound signal, which is obtained by extracting only a voice signal from the collected noise signal, and ‘P’ being a probability value indicating that a human voice signal is included in the collected noise signal through a deep learning algorithm, and a signal output device that outputs the first sound signal or a second sound signal, which is obtained by converting an overall volume of the collected noise signal, based on a value of the ‘P’. At this time, the second sound signal may be a sound signal, of which a reduction ratio of a volume is converted to be great as the volume corresponds to a great portion, from among the collected noise signal.

In an embodiment of the inventive concept, the signal input device may include a microphone device, and the signal output device may include a speaker device. The noise canceling device may include a pair of body parts including housing, to which the signal output device is mounted, and a cushion part, a connection part connecting the pair of body parts, and a headset including a battery built into at least one side of the body part and the connection part and providing a driving source.

In an embodiment of the inventive concept, the signal output device may output the first sound signal when the value of the ‘P’ is greater than or equal to ‘0’ and less than a first reference value, may output the second sound signal when the value of the ‘P’ is greater than or equal to the first reference value and less than or equal to a second reference value, and may output the first sound signal when the value of the ‘P’ is greater than the first reference value and less than or equal to ‘1’. At this time, the first reference value and the second reference value may be set in advance.

According to an embodiment, a computer program is stored in a computer-readable recording medium to execute a noise canceling method by using the various deep learning algorithms described above while being combined with a computer.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
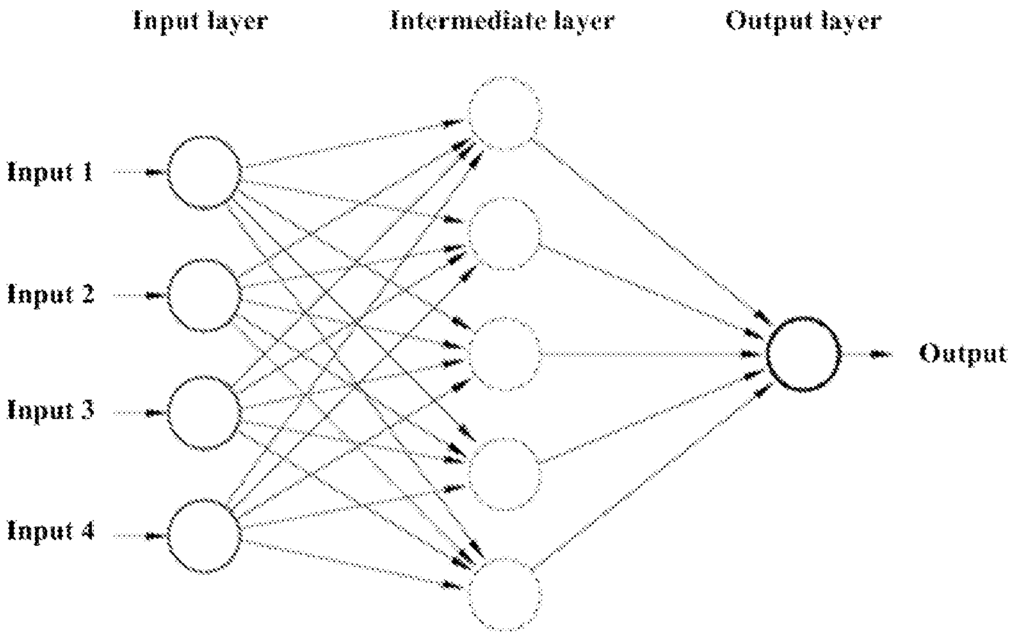
FIG. 1 is a diagram briefly illustrating a basic concept of an ANN.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the inventive concept will be described in detail with reference to accompanying drawings.

The inventive concept discloses a noise canceling method that is capable of maximally maintaining the voice of a nearby person while canceling ambient noise. In more detail, the inventive concept discloses an active noise canceling method capable of adaptively canceling ambient noise by using a deep learning algorithm.

Prior to a description, the meaning of terms used in the present specification will be described briefly. However, because the description of terms is used to help the understanding of this specification, it should be noted that if the inventive concept is not explicitly described as a limiting matter, it is not used in the sense of limiting the technical idea of the inventive concept.

First of all, a deep learning algorithm is one of machine learning algorithms and refers to a modeling technique developed from an artificial neural network (ANN) created by mimicking a human neural network. The ANN may be configured in a multi-layered structure as shown in FIG. 1.

FIG. 1 is a diagram briefly illustrating a basic concept of an ANN.

As shown in FIG. 1, the ANN may have a hierarchical structure including an input layer, an output layer, and at least one or more intermediate layers (or hidden layers) between the input layer and the output layer. On the basis of a multi-layered structure, the deep learning algorithm may derive highly reliable results through learning to optimize a weight of an interlayer activation function.

The deep learning algorithm applicable to the inventive concept may include a deep neural network (DNN), a convolutional neural network (CNN), a recurrent neural network (RNN), and the like.

The DNN basically improves learning results by increasing the number of intermediate layers (or hidden layers) in a conventional ANN model. For example, the DNN performs a learning process by using two or more intermediate layers. Accordingly, a computer may derive an optimal output value by repeating a process of generating a classification label by itself, distorting space, and classifying data.

Unlike a technique of performing a learning process by extracting knowledge from existing data, the CNN has a structure in which features of data are extracted and patterns of the features are identified. The CNN may be performed through a convolution process and a pooling process. In other words, the CNN may include an algorithm complexly composed of a convolution layer and a pooling layer. Here, a process of extracting features of data (called a "convolution process") is performed in the convolution layer. The convolution process may be a process of examining adjacent components of each component in the data, identifying features, and deriving the identified features into one sheet, thereby effectively reducing the number of parameters as one compression process. A process of reducing the size of a layer from performing the convolution process (called a "pooling process") is performed in a pooling layer. The pooling process may reduce the size of data, may cancel noise, and may provide consistent features in a fine portion. For example, the CNN may be used in various fields such as information extraction, sentence classification, and face recognition.

The RNN has a circular structure therein as a type of ANN specialized in learning repetitive and sequential data. The RNN has a feature that enables a link between present learning and past learning and depends on time, by applying a weight to past learning content by using the circular structure to reflect the applied result to present learning. The RNN may be an algorithm that solves the limitations in learning conventional continuous, repetitive, and sequential data, and may be used to identify speech waveforms or to identify components before and after a text.

However, these are only examples of specific deep learning techniques applicable to the inventive concept, and other deep learning techniques may be applied to the inventive concept according to an embodiment.

Figure 2:
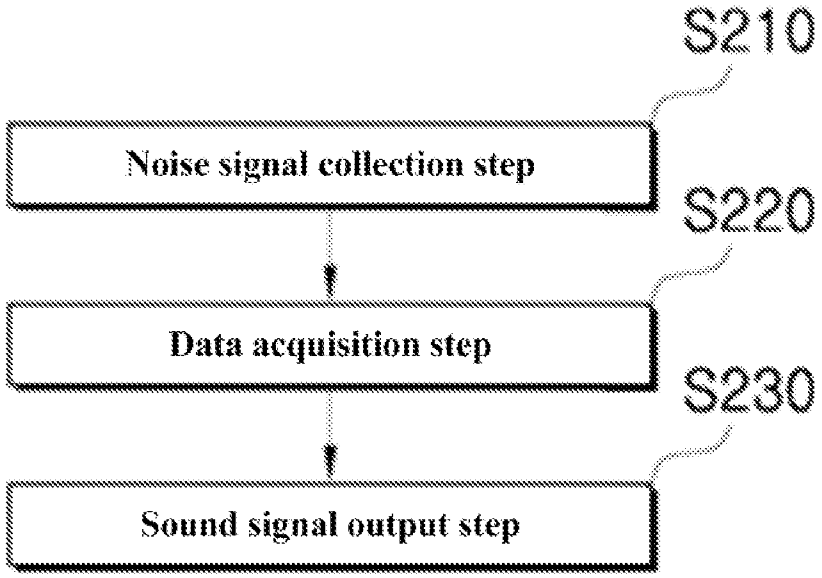
FIG. 2 is a diagram schematically illustrating a noise canceling method, according to an embodiment of the inventive concept.

FIG. 2 is a diagram schematically illustrating a noise canceling method, according to an embodiment of the inventive concept.

As shown in FIG. 2, a noise canceling method using a deep learning algorithm according to an embodiment of the inventive concept may include step S210 of collecting a noise signal, step S220 of obtaining data, and step S230 of outputting a sound signal.

First of all, in step S210, a noise canceling device collects a noise signal. In more detail, the noise canceling device may collect an ambient sound signal by using a separate microphone device.

In step S220, the noise canceling device may obtain a first sound signal obtained by extracting only the voice signal from the noise signal collected through step S210, and a probability value 'P' indicating that a human voice signal is included in the collected noise signal, through a deep learning algorithm. Here, the first sound signal may include a signal obtained by extracting only the voice signal from the collected noise signal through a deep learning algorithm learned based on pieces of training data and pieces of teacher data. Furthermore, the probability value 'P' may include a probability value indicating that the human voice signal is included in the collected signal through a deep learning algorithm learned based on the pieces of training data and the pieces of teacher data, or a probability value indicating that the received signal corresponds to a human voice signal.

Accordingly, through step S220, in addition to obtaining noise-canceled sound signals through the deep learning algorithm, the noise canceling device may also obtain a probability value that a human voice signal is included in the previously collected (noise) signal. In this way, a user may detect/listen to voice signals of nearby people with high probability by outputting different sound signals depending on the probability value as follows.

In step S230, the noise canceling device may output the first sound signal or a second sound signal, which is obtained by converting the volume of the collected noise signal, based on the probability value 'P'. At this time, the second sound signal may include a sound signal, of which the volume reduction ratio is converted to be great as a volume corresponds to a great portion, from among the collected noise signal.

In more detail, the volume of a voice signal corresponds to the amplitude of a sound wave. Accordingly, outputting the second sound signal in step S230 may include outputting the second sound signal of which the amplitude reduction ratio is converted to a great value as the amplitude increases, while the amplitudes of sound waves in the collected noise signal are converted.

To this end, the volume of the collected noise signal and the volume of the second sound signal may have various relationships. For example, when 'x' is the volume of the collected noise signal, and 'y' is the converted volume of the second sound signal, the two parameters may have a relationship as shown in Equation 1 below.

$$y=\log(x+1). \quad \text{[Equation 1]}$$

In an embodiment of the inventive concept, the example is only an applicable example. As another embodiment of the inventive concept, the example is also applied to a relationship different from Equation 1. However, even in this case, the two parameters described above may have a relationship in which the magnitude of "|x−y|" gradually increases as 'x' increases.

As mentioned above, the noise canceling device may output a first sound signal or a second sound signal depending on the value 'P'. As a specific example applicable to the inventive concept, the noise canceling device may operate as follows.

A. When 'P' is greater than or equal to '0' and less than a first reference value (i.e., 0≥P<the first reference value), the noise canceling device outputs the first sound signal.

B. When 'P' is greater than or equal to the first reference value and less than or equal to a second reference value (i.e., the first reference value≥P≥the second reference value), the noise canceling device outputs the second sound signal.

C. When 'P' is greater than the first reference value and less than or equal to '1' (i.e., first reference value<P≥1), the noise canceling device outputs the first sound signal.

Here, the first reference value and the second reference value may be set in advance. For example, each of the first reference value and the second reference value may be set to a reference value having a low filtering effect of a voice signal through a deep learning algorithm. In this case, the reference value may be adaptively changed depending on a learning process of the deep learning algorithm. As another example, the first reference value and the second reference value may be set by a user's setting/input. In this way, the user may decide whether to apply voice filtering, depending on the surrounding environment or the user's needs, thereby configuring a dedicated environment suitable for the user.

In an example applicable to the inventive concept, an operation for the noise canceling device to obtain a first sound signal and an operation for the noise canceling device to obtain the probability value 'P' through the deep learning algorithm may be performed in time series. In this case, according to an embodiment, the probability value 'P' may be obtained based on the resulting value of the first sound signal. In other words, in addition to applying a deep learning algorithm to the collected noise signal, the noise canceling device may calculate the probability value 'P' in consideration of the result value of the first sound signal in which only the voice signal is filtered.

In another example applicable to the inventive concept, an operation for the noise canceling device to obtain a first sound signal and an operation for the noise canceling device to obtain the probability value 'P' through the deep learning algorithm may be performed integrally through a single algorithm. In this case, the noise canceling device may efficiently and quickly obtain the first sound signal and the probability value 'P' through the single algorithm.

In an embodiment of the inventive concept, a deep learning algorithm for canceling noise may be learned based on a first training data set including only a sound signal other than a human voice signal, and a second training data set including an arbitrary noise signal in an arbitrary human voice signal. In this way, the deep learning algorithm may efficiently extract only the voice signal from the collected noise signal, and may also determine whether a voice signal is included in the collected noise signal, with high reliability.

Figure 3:
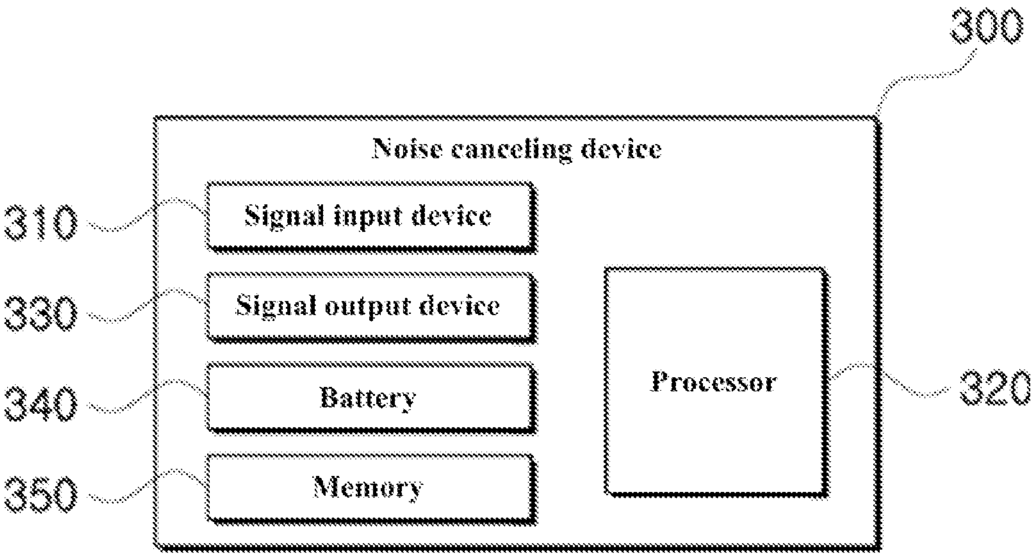
FIG. 3 is a diagram schematically illustrating a noise canceling device, according to an embodiment of the inventive concept.

FIG. 3 is a diagram schematically illustrating a noise canceling device, according to an embodiment of the inventive concept.

As illustrated in FIG. 3, a noise canceling device 300 according to an embodiment of the inventive concept may include a signal input device 310, a processor 320, a signal output device 330, a battery 340, and a memory 350.

In detail, the signal input device 310 may collect a noise signal. To this end, the signal input device 310 may include a microphone device.

Through a deep learning algorithm, the processor 320 may obtain the probability value P indicating that the human voice signal is included in a first sound signal, which is obtained by extracting only a voice signal from a noise signal collected through the signal input device 310, and the collected noise signal.

The signal output device 330 may output the first sound signal based on the value of ‘P’, or may output a second sound signal obtained by converting the overall volume of the collected noise signal. To this end, the signal output device 330 may include a speaker device. At this time, the second sound signal reduces the volume of the collected noise signal. The second sound signal may be a signal of which the reduced volume is great as the volume is great.

In more detail, the signal output device 330 may operate depending on the value of ‘P’ as follows.

A. When ‘P’ is greater than or equal to ‘0’ and less than a first reference value (i.e., 0≥P<the first reference value), the noise canceling device outputs the first sound signal.

B. When ‘P’ is greater than or equal to the first reference value and less than or equal to a second reference value (i.e., the first reference value≥P≥the second reference value), the noise canceling device outputs the second sound signal.

C. When ‘P’ is greater than the first reference value and less than or equal to ‘1’ (i.e., first reference value<P≥1), the noise canceling device outputs the first sound signal.

The first reference value and the second reference value may be set in advance.

Here, the first reference value and the second reference value may be set in advance and stored in the memory 350. For example, each of the first reference value and the second reference value may be set to a reference value having a low filtering effect of a voice signal through a deep learning algorithm. In this case, the reference value may be adaptively changed depending on a learning process of the deep learning algorithm. As another example, the first reference value and the second reference value may be set by a user’s setting/input. In this way, the user may decide whether to apply voice filtering, depending on the surrounding environment or the user’s needs, thereby configuring a dedicated environment suitable for the user.

According to an embodiment applicable to the inventive concept, the noise canceling device 300 may be configured in a form of a wireless headset. To this end, the noise canceling device 300 may include a pair of body parts including housing, to which the signal output device 330 is mounted, and a cushion part, a connection part connecting the pair of body parts, and the battery 340 built into at least one side of the body part and the connection part and providing a driving source.

In addition, the noise canceling device 300 according to an embodiment of the inventive concept may operate depending on various noise canceling methods described above.

According to an embodiment of the inventive concept, even though a deep learning algorithm having low complexity, it is possible to listen to a voice signal from ambient noise with high probability.

Moreover, the inventive concept may additionally calculate the probability that a voice signal is included in a noise signal collected through the deep learning algorithm, and then may control a voice output signal, thereby minimizing a voice signal from being removed because the voice signal is incorrectly filtered.

Additionally, a computer program according to an embodiment of the inventive concept may be stored in a computer-readable recording medium to execute a noise canceling method by using the various deep learning algorithms described above while being combined with a computer.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Further, the code may further include additional information that is necessary for the processor of the computer to execute the functions or a memory reference related code on which location (address) of an internal or external memory of the computer should be referenced by the media. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The steps of a method or algorithm described in connection with the embodiments of the inventive concept may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form known in the art to which the inventive concept pertains.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A noise canceling method by using a deep learning algorithm performed by a noise canceling device, the method comprising:

collecting a noise signal;

through a deep learning algorithm, obtaining a first sound signal, which is obtained by extracting only a voice signal from the collected noise signal, and ‘P’ being a probability value indicating that a human voice signal is included in the collected noise signal; and on a basis of a value of the 'P', outputting the first sound signal or a second sound signal obtained by converting an overall volume of the collected noise signal, wherein the second sound signal is a sound signal, of which a reduction ratio of the overall volume is converted to be increased correspondingly to the overall volume of the collected noise signal.

2. The method of claim 1, wherein the outputting of the first sound signal or the second sound signal includes:

when the value of the 'P' is greater than or equal to '0' and less than a first reference value, outputting the first sound signal;

when the value of the 'P' is greater than or equal to the first reference value and less than or equal to a second reference value, outputting the second sound signal; and when the value of the 'P' is greater than the first reference value and less than or equal to '1', outputting the first sound signal, wherein the first reference value and the second reference value are set in advance.

3. The method of claim 1, wherein the second sound signal is a signal obtained by converting a volume of the collected noise signal based on Equation 1:

$$y=\log(x+1), \text{ and} \quad \text{[Equation 1]}$$

wherein 'x' is the volume of the collected noise signal, and 'y' is the converted volume of the second sound signal.

4. The method of claim 1, wherein the obtaining of 'P' includes:

obtaining the first sound signal through the deep learning algorithm; and obtaining the value of the 'P' through the deep learning algorithm, wherein the obtaining of the first sound signal and the obtaining of the value of the 'P' are performed in time series.

5. The method of claim 1, wherein the obtaining of 'P' includes:

obtaining the first sound signal through the deep learning algorithm; and obtaining the value of the 'P' through the deep learning algorithm, wherein the obtaining of the first sound signal and the obtaining of the value of the 'P' are performed integrally through a single algorithm.

6. The method of claim 1, wherein the deep learning algorithm is learned based on a first training data set including only a sound signal other than a human voice signal, and a second training data set including an arbitrary noise signal in an arbitrary human voice signal.

7. A noise canceling device comprising:

a signal input device configured to collect a noise signal;

a processor configured to obtain a first sound signal, which is obtained by extracting only a voice signal from the collected noise signal, and 'P' being a probability value indicating that a human voice signal is included in the collected noise signal through a deep learning algorithm; and a signal output device configured to output the first sound signal or a second sound signal, which is obtained by converting an overall volume of the collected noise signal, based on a value of the 'P', wherein the second sound signal is a sound signal, of which a reduction ratio of the overall volume is converted to be increased correspondingly to the overall volume of the collected noise signal.

8. The noise canceling device of claim 7, wherein the signal input device includes a microphone device, wherein the signal output device includes a speaker device, wherein the noise canceling device includes:

a pair of body parts including a housing, to which the signal output device is mounted, and a cushion part;

a connection part connecting the pair of body parts; and a headset including a battery built into at least one side of the body part and the connection part and configured to provide a driving source.

9. The noise canceling device of claim 7, wherein the signal output device is configured to:

when the value of the 'P' is greater than or equal to '0' and less than a first reference value, output the first sound signal;

when the value of the 'P' is greater than or equal to the first reference value and less than or equal to a second reference value, output the second sound signal; and when the value of the 'P' is greater than the first reference value and less than or equal to '1', output the first sound signal, wherein the first reference value and the second reference value are set in advance.

10. The noise canceling device of claim 7, wherein the second sound signal is a signal obtained by converting a volume of the collected noise signal based on Equation 1:

$$y=\log(x+1), \text{ and} \quad \text{[Equation 1]}$$

wherein 'x' is the volume of the collected noise signal, and 'y' is the converted volume of the second sound signal.

11. The noise canceling device of claim 7, wherein the processor is configured to:

a first operation of obtaining the first sound signal through the deep learning algorithm; and a second operation of obtaining the value of the 'P' through the deep learning algorithm, wherein the first operation and the second operation are performed in time series.

12. The noise canceling device of claim 7, wherein the processor is configured to:

a first operation of obtaining the first sound signal through the deep learning algorithm; and a second operation of obtaining the value of the 'P' through the deep learning algorithm, wherein the first operation and the second operation are performed integrally through a single algorithm.

13. The noise canceling device of claim 7, wherein the deep learning algorithm is learned based on a first training data set including only a sound signal other than a human voice signal, and a second training data set including an arbitrary noise signal in an arbitrary human voice signal.

* * * * *